(12) United States Patent
Lee et al.

(10) Patent No.: US 8,169,967 B2
(45) Date of Patent: May 1, 2012

(54) METHOD FOR PERFORMING HANDOVER BY CONSIDERING QUALITY OF SERVICE IN BROADBAND MOBILE COMMUNICATION SYSTEM AND SYSTEM FOR PROVIDING THE SAME

(75) Inventors: Chang-Hyun Lee, Seoul (KR); Sung-Jea Ko, Seoul (KR); Yun-Je Oh, Yongin-si (KR); Tae-Sung Park, Yongin-si (KR); Jeong-Rok Park, Hwaseong-si (KR); Jeong-Seok Choi, Yongin-si (KR); Young-Hun Joo, Yongin-si (KR); Hye-Soo Kim, Seoul (KR); Kyung-Ho Chae, Seoul (KR)

(73) Assignees: Samsung Electronics Co., Ltd, Maetan-dong, Yeongtong-gu, Suwon-si, Gyeonggi-do (KR); Korea University Industrial & Academic Collaboration Foundation, Seongbuk-gu, Seoul (KR)

( * ) Notice: Subject to any disclaimer, the term of this patent is extended or adjusted under 35 U.S.C. 154(b) by 840 days.

(21) Appl. No.: 12/050,341

(22) Filed: Mar. 18, 2008

(65) Prior Publication Data
US 2008/0240043 A1    Oct. 2, 2008

(30) Foreign Application Priority Data

Mar. 30, 2007   (KR) .................. 10-2007-0031490

(51) Int. Cl.
*H04W 4/00*   (2009.01)
*H04W 36/00*  (2009.01)
*H04B 7/216*  (2006.01)
*H04M 11/00*  (2006.01)

(52) U.S. Cl. ........ 370/331; 370/335; 370/342; 455/436; 455/403; 455/442; 455/439

(58) Field of Classification Search .................. 370/331
See application file for complete search history.

(56) References Cited

U.S. PATENT DOCUMENTS
7,310,526 B2 *  12/2007  Sang et al. .................. 455/436
(Continued)

FOREIGN PATENT DOCUMENTS
JP   2006-303739   11/2006
(Continued)

OTHER PUBLICATIONS

IEEE 802.16; "Draft IEEE Standard Local and Metropolitan Area Networks; Part 16: Air Interface for Fixed and Mobile Broadband Wireless Access Systems; Amendment for Physical and Medium Access Control Layers for Combined Fixed and Mobile Operation in Licensed Bands, IEEE P802.16e/D5;" Sep. 18, 2004; XP002541507.

(Continued)

*Primary Examiner* — Jeffrey Pwu
*Assistant Examiner* — Majid Esmaeilian
(74) *Attorney, Agent, or Firm* — Cha & Reiter, LLC

(57) ABSTRACT

A system and method for performing a handover of a mobile station (MS) by considering Quality of Service (QoS) in a broadband mobile communication system. The method can include the steps of: receiving information about one or more neighbor base stations and reception strengths for the neighbor base stations from a Serving Radio Access System (RAS) currently communicating with the MS; extracting a value of a specific field from the received information about the neighbor base stations; combining the extracted value of the specific field with the reception strengths to thereby obtain combined values, and selecting a maximum value among the combined values; and transmitting a handover (handoff) request message to a base station corresponding to the selected maximum value. The system includes an MS that analyzes information about neighbor stations received in a Mobile Neighbor Base-station Advertisement (MOB_N-BR_ADV) message to select a target RAS.

21 Claims, 6 Drawing Sheets

U.S. PATENT DOCUMENTS

| | | | |
|---|---|---|---|
| 7,570,618 B2 * | 8/2009 | Son et al. | 370/331 |
| 2005/0101328 A1 * | 5/2005 | Son et al. | 455/436 |
| 2005/0272403 A1 * | 12/2005 | Ryu et al. | 455/403 |
| 2006/0121903 A1 * | 6/2006 | Lee et al. | 455/439 |

FOREIGN PATENT DOCUMENTS

| | | |
|---|---|---|
| KR | 2007-23192 | 2/2007 |
| KR | 10-808464 | 2/2008 |
| WO | WO 2006083201 A1 * | 8/2006 |
| WO | WO 2006/121864 | 11/2006 |

OTHER PUBLICATIONS

IEEE Computer Society et al.; IEEE Standard for Local and Metropolitan Area Networks; Part 16: Air Interface for Fixed and Mobile Broadband Wireless Access Systems; Amendment 2: Physical and Medium Access Control Layers for Combined Fixed and Mobile Operation in Licensed Bands and Corrigendum 1; IEEE Std 802.6e-2005 and IEEE Std.; Jan. 1, 2006; XP017601713.

* cited by examiner

Distance  T_ADD : Threshold to trigger transition from the neighbor RAS
T_DROP : Threshold to trigger the handoff drop timer

US 8,169,967 B2

METHOD FOR PERFORMING HANDOVER BY CONSIDERING QUALITY OF SERVICE IN BROADBAND MOBILE COMMUNICATION SYSTEM AND SYSTEM FOR PROVIDING THE SAME

CLAIM OF PRIORITY

This application claims the benefit of priority under 35 U.S.C. §119(a) from an application entitled "Method for performing Handover by Considering Quality of Service in Broadband Mobile Communication System and System for Providing The Same," filed in the Korean Intellectual Property Office on Mar. 30, 2007 and assigned Serial No. 2007-31490, the contents of which are hereby incorporated by reference in its entirety.

BACKGROUND OF THE INVENTION

1. Field of the Invention

The present invention relates to a method for performing a handover among base stations in a broadband mobile communication system while guaranteeing the operability of a mobile station. More particularly, the present invention relates to a system and method for performing a handover by considering Quality of Service (QoS) in a broadband mobile communication system, in which the QoS, as well as the strength of a received signal between a mobile station (MS) and a base station, is taken into account by using neighboring base station information when performing a handover in a multi-cell boundary area.

2. Description of the Related Art

Generally, research has been actively conducted in order to provide users with services including various Quality of Services (QoS) allowing data transmission at a speed of nearly 100 Mbps in a future communication system, i.e., the 4$^{th}$ generation (4G) communication system. In particular, research has been actively conducted in the area of supporting a high-speed service while guaranteeing mobility and QoS in a Local Area Network (LAN) system, a Metropolitan Area Network (MAN) system and a Broadband Wireless Access communication system. A representative communication system regarding the research corresponds to an Institute of Electrical and Electronics Engineers (IEEE) 802.16a communication system and IEEE 802.16e communication system.

The IEEE 802.16a communication system and the IEEE 802.16e communication system apply an Orthogonal Frequency Division Multiplexing (OFDM)/Orthogonal Frequency Division Multiple Access (OFDMA) scheme in order to support a broadband transmission network to a physical channel of a wireless MAN system. Moreover, the IEEE 802.16a communication system considers only both a single cell structure and a fixed state of a Mobile Station (MS), i.e., a state where the mobility of the MS is not taken into account. On the other hand, the IEEE 802.16e communication system considers the mobility of the MS of the IEEE 802.16a communication system, and the MS is referred to as an MS having a mobility.

A structure of the IEEE 802.16e communication system in a broadband mobile communication system will now be described with reference to FIG. 1.

FIG. 1 is an example that schematically illustrates a conception of a handover of multi cells in a broadband mobile communication system. Referring to FIG. 1, the IEEE 802.16e communication system has a multi-cell structure, and provides a given MS 100 with service in a corresponding cell area where each of base stations (102, 104 and 106) is located. Signal transmission/reception between each of the base stations (102, 104 and 106) and the MS 100 is accomplished by using the OFDM/OFDMA scheme.

However, the MS is located in a boundary area (i.e. handover area) of cells controlled by all of base station 102, base station 104, and base station 106, respectively. Accordingly, it is possible to support mobility of the MS 100 only when a handover of the MS 100 is supported.

Here, the handover refers to a process regarding communication according to a movement of a given MS from the area of a base station to the area of a new base station or to a new antenna permitting area, in another words, to a new traffic channel. It is important to keep a mobile call successful and a quality of voice information at a certain minimum predetermined level without deterioration during the handover process. It can be said that handover is a procedure of setting a new communication path between an optimal base station and the MS by efficiently recognizing changes in the communication environment. That is, the handover corresponds to a procedure of establishing a communication path to a neighboring base station whose communication environment is superior to a communication environment of a current serving base station when an MS is located in a cell boundary area.

FIG. 1 shows that, while an MS 100 is in a cell area controlled by the base station 102 and performs communication with the base station 102 through a connection setting therewith, the MS 100 moves to a cell area controlled by the base station 104 or the base station 106 and performs a handover in order to communicate again. In this case, when the MS 100 is located in a cell boundary area where a handover is required, the MS 100 determines a handover in consideration of strengths of the signals that the base stations 104 and 106 transmit to the MS 100. That is, as shown in FIG. 1, when a strength of the received signal from the base station 104 is higher than a strength of the received signal from the base station 106, the MS performs a handover with the base station 104.

FIG. 2 shows a relation among the MS 100 located in a cell boundary area and the strengths of the received signals from the base stations 102, 104, and 106, and a distance between the MS 100 and the base stations 102, 104, and 106. FIG. 2 is a graphically illustrates a signal strength between an MS and a base station during a handover in a broadband mobile communication system.

Referring to FIG. 2, when a reception signal strength between an MS 100 and a Radio Access Station RAS1 goes below a certain level (T_DROP), a handover is generally performed. As shown in FIG. 2, it is understood that based on the signal strength, a handover is going to be performed to hand the MS 100 over to the RAS2.

As described above, if the MS performs a new connection setup whenever the MS changes a connection base station according to an optimal reception signal strength, the MS will attempt a new connection at every change of the base station. In order to easily establish a connection with a new base station as the MS moves, in a conventional broadband wireless access communication system, a current base station connected to the MS provides the MS with information about neighboring base stations, to which the MS on the move is likely to be newly connected thereto, through a neighboring base station information advertisement message.

Accordingly, it is preferable that the MS should be first aware of information about neighboring cells, i.e., neighbor base stations, in order to move to a neighboring cell and perform a handover thereto. Therefore, the MS cyclically receives a neighbor base station advertisement message from a serving base station which currently provides a service to the MS and collects information about the neighbor base stations.

FIG. 3 illustrates an example of a situation where only a signal strength between an MS and a base station is considered during a handover in a conventional broadband mobile communication system. Referring to FIG. 3, when an MS 300 is located in an area where a handover is required, the MS 300 receives information about neighboring base stations 302, 304 and 306 from a serving base station (not shown) with which the MS 300 currently communicates, and receives a signal from each of the neighbor base stations 302, 304 and 306 to thereby perform a handover based on the strength of the received signal from the base stations 302, 304 and 306.

Still referring to the example shown FIG. 3, the base station 302 is communicating with MSs 31, 32 and 33, respectively, and a utilization of the base station 302 corresponds to 40% of capacity. The base station 304 is communicating with MSs 34, 35, 36, 37, 38 and 39, respectively, and a utilization of the base station 304 corresponds to 90%. The base station 306 is communicating with an MS 30 and a utilization of the base station 306 corresponds to 10%. In this case, when the MS 300 performs a handover to a base station 304, which has transmitted an optimal strength of the received signal, by considering only the strength of the received signal, an optimal QoS cannot be guaranteed for the handed-over MS 300 because the utilization of the base station 304 corresponds to 90% of capacity.

In view of the example shown in FIG. 3, when an MS Neighbor Advertisement (MOB_NBR_ADV) message includes only information about the neighboring base station is transmitted to the MS, and the MS performs a handover by searching a base station, which transmits an optimal received signal, on the basis of the neighbor base station information. However, when conventionally performing a handover in a multi-cell boundary area such as in the example in FIG. 3, there occurs a problem regarding an inability to guarantee a certain QoS.

SUMMARY OF THE INVENTION

Accordingly, the present invention has been made in part to solve at least some of the above-mentioned problems occurring in the prior art, and providing advantages as discussed herein below. The present invention provides a system and method for performing a handover by considering Quality of Service (QoS) in a broadband mobile communication system, in which the QoS as well as the strength of a received signal between a mobile station (MS) and a base station is taken into account by using neighbor base station information when performing a handover in a multi cell boundary area.

In accordance with an exemplary aspect of the present invention, there is provided a method for performing a handover of a mobile station (MS) by considering Quality of Service (QoS) in a broadband mobile communication system, the method comprising the exemplary steps of: receiving information about neighbor base stations and reception strengths for the neighbor base stations from a Serving Radio Access Station (RAS) currently communicating with the MS; extracting a value of a specific field from the received information about the neighbor base stations; combining the extracted value of the specific field with the reception strengths to thereby obtain combined values, and selecting a maximum value among the combined values; and transmitting a handover request message to a base station corresponding to the selected maximum value.

BRIEF DESCRIPTION OF THE DRAWINGS

The above and other exemplary aspects, features and advantages of the present invention will be more apparent from the following detailed description taken in conjunction with the accompanying drawings, in which.

DETAILED DESCRIPTION OF THE INVENTION

Hereinafter, an exemplary embodiment according to the present invention will be described with reference to the accompanying drawings, which have been provided for illustrative purposes and do not limit the claimed invention to those examples shown and described. In the description herein below, there are a number of detailed components shown only for providing a general understanding of the present invention, it is to be understood by a person of ordinary skill in the art that the present invention does not require inclusion of such detailed components.

Meanwhile, in the following description of the present invention, a person of ordinary skill in the art shall understand that a term 'handover' and a term 'handoff' have the same meaning such that they are used together and/or interchangeably. In other words, the term "handover" or the term "handoff" is used in the case where a given mobile station (MS) is disconnected from the currently connected base station (a serving base station) and is connected to one base station ('an object base station' or 'a target base station') among neighbor (neighboring) base stations depending on conditions.

Additionally, a base station that is currently connected to the MS and can transmit/receive data to/from the MS is generally referred to as a "Serving RAS", and a plurality of base stations, which are located around the Serving RAS and to which the MS moves and can hand over, are referred to as 'Neighbor base stations'.

Figure 1:
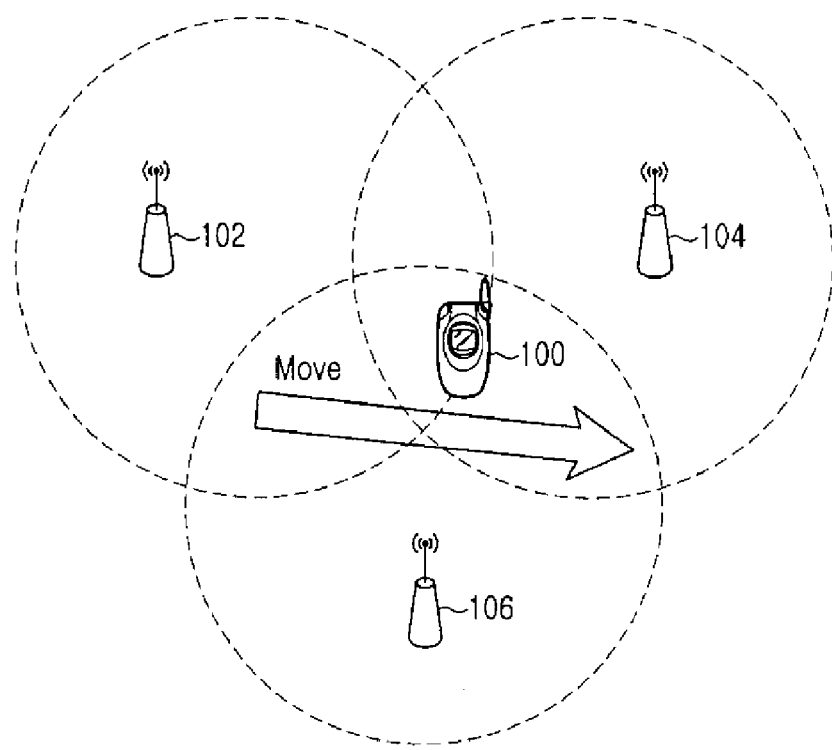
FIG. 1 is a view schematically illustrating a conception of a handover of multi cells in a broadband mobile communication system.
Figure 2:
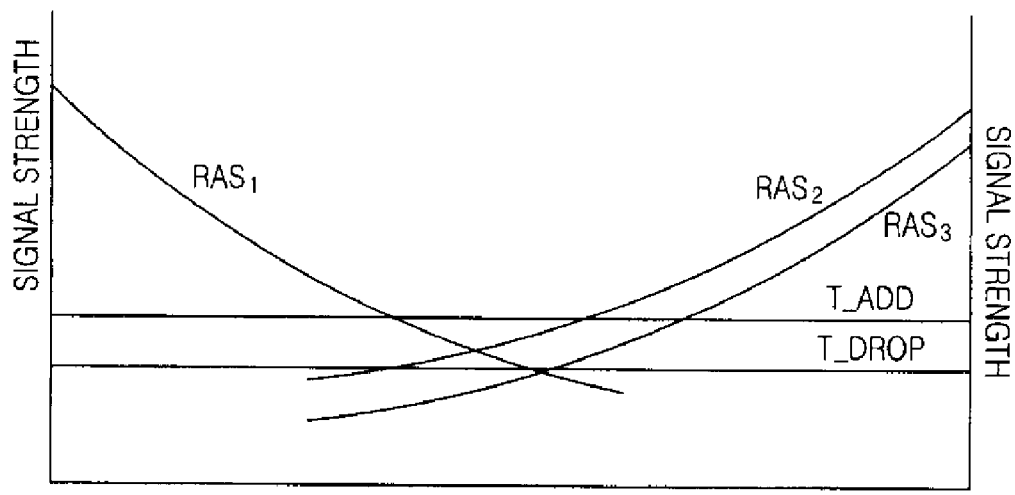
FIG. 2 is a graph illustrating a signal strength between a Mobile Station (MS) and a base station during a handover in a broadband mobile communication system.
Figure 3:
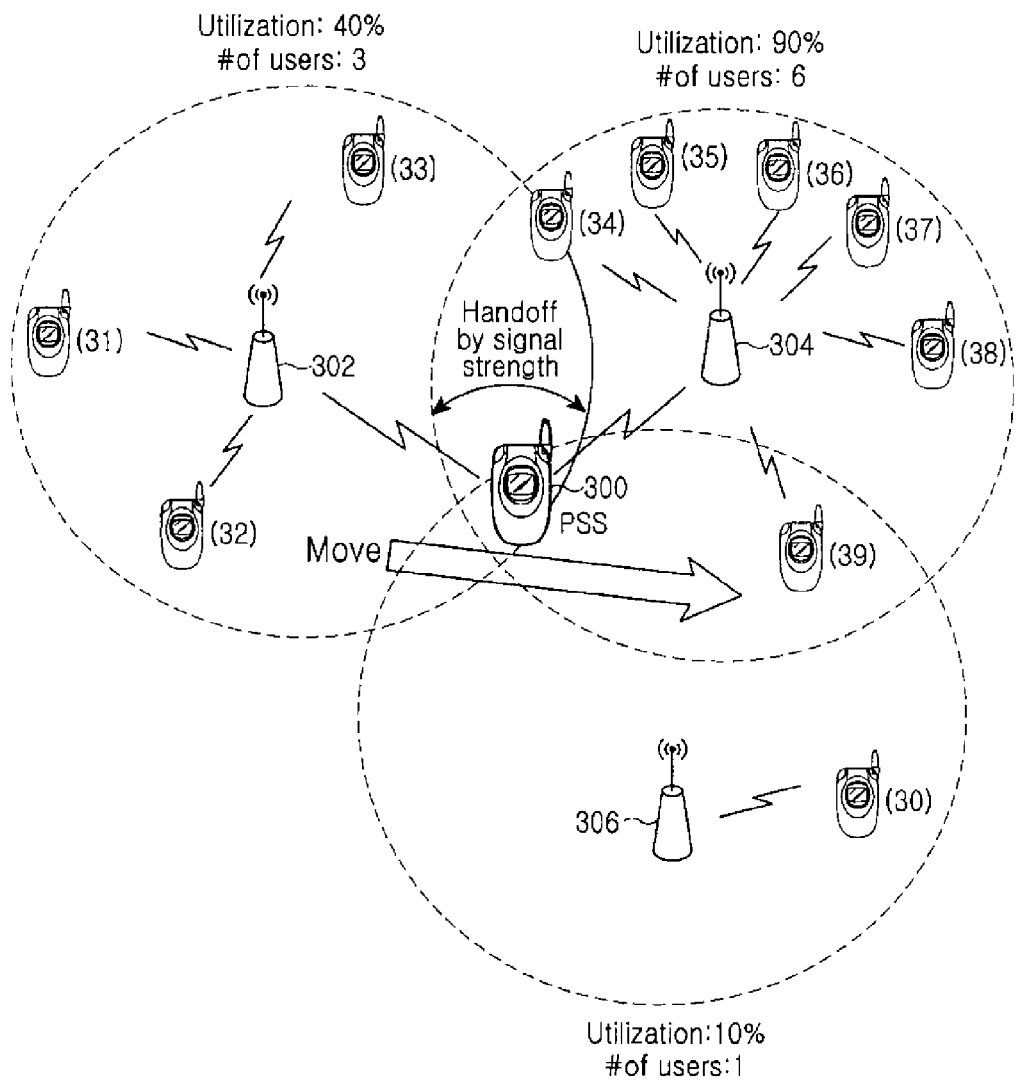
FIG. 3 is a view schematically illustrating a situation where only a signal strength between an MS and a base station is considered during a handover in a conventional broadband mobile communication system.
Figure 4:
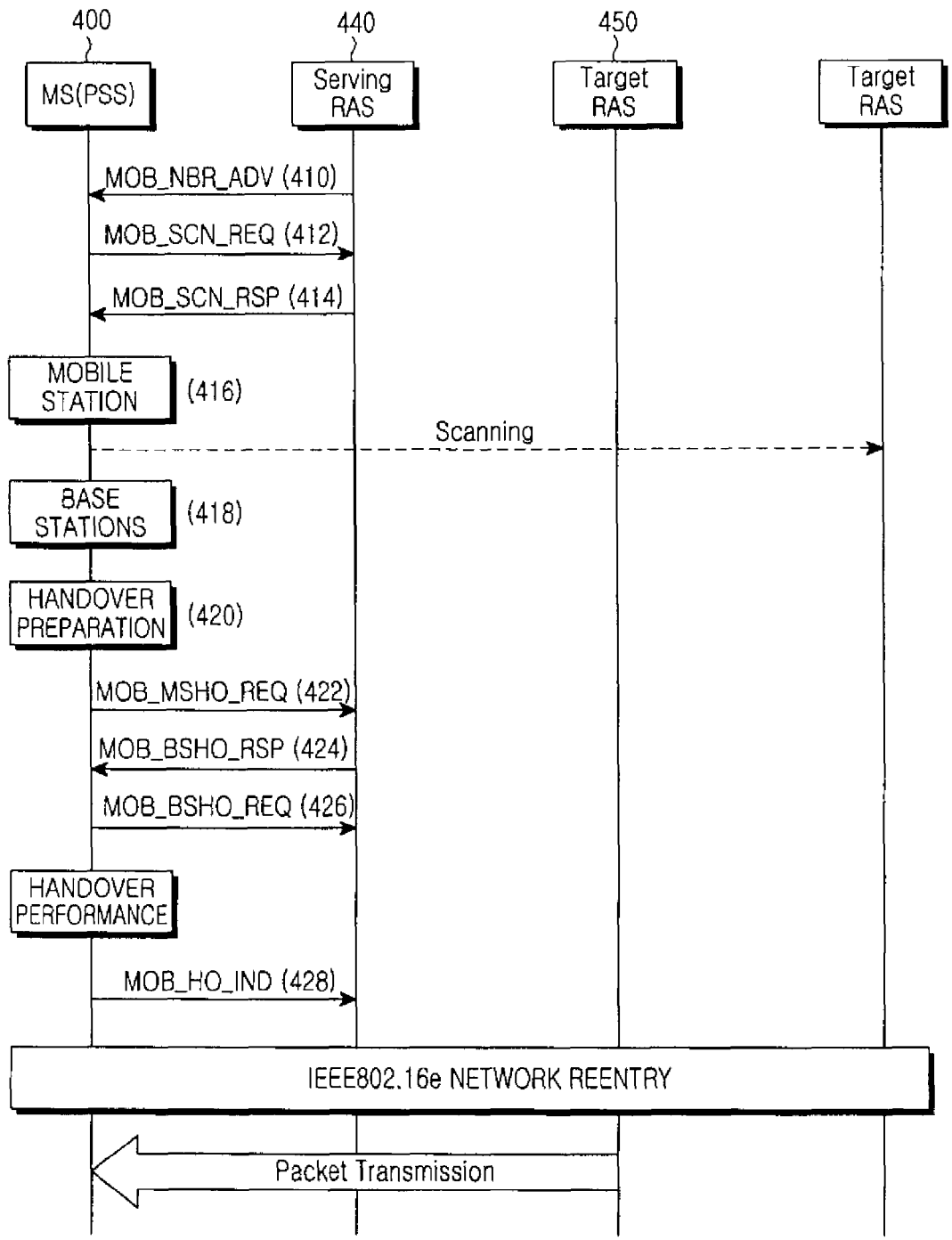
FIG. 4 is a signal flowchart illustrating a procedure of performing a handover in a broadband mobile communication system according to an exemplary embodiment of the present invention.

FIG. 4 illustrates a signal flow of the exemplary steps for handover performance in a broadband mobile communication system according to an exemplary embodiment of the present invention. Referring to FIG. 4, a Serving Radio Access Station (RAS) 440 first transmits an MS Neighbor Advertisement (MOB_NBR_ADV) message to an MS 400 (step 410). Here, Table 1 shows herein below an example of the structure of the MOB_NBR_ADV message.

TABLE 1

| Syntax | Size | Note |
| --- | --- | --- |
| Management Message Type = 53 | 8 | |
| Skip-Optional-Fields bitmap | 24 | Unique ID assigned to the operator |
| Configuration Change Count | 8 | Incremented each time the information for the associated neighbor BS has changed. |
| Fragmentation Index | 4 | Indicates the current fragmentation index. |
| Total Fragmentation | 4 | Indicates the total number of fragmentations. |
| N_NEIGHBORS | 8 | |
| Length | 8 | Length of message information within the iteration of N_NEIGHBOR in bytes. |
| PHY Profile ID | 8 | Aggregated IDs of Co-located FA Indicator, PA Configuration Indicator, FFT size, Bandwidth, Operation Mode of the starting subchannelization of a frame, and Channel Number |
| FA Index | 8 | Frequency Assignment Index |
| BS EIRP | 8 | This field is present only if the BS EIRP indicator is set in PHY Profile ID. |
| Neighbor BSID | 24 | This is an optional field for OFDMA PHY and is omitted or skipped if Skip optional fields Flag = 1 |
| Preamble Index/Subchannel Index | 8 | For the SCa and OFDMA PHY, this parameter defines the PHY specific preamble. |
| HO Process Optimization | 8 | HO Process Optimization is provided as part of this message is indicative only. |
| Scheduling Service Supported | 8 | Bitmap to indicate if BS supports a particular scheduling service. 1 indicates support, 0 indicates no support: bit 0: Unsolicited Grant Service (UGS) bit 1: Real-time Polling Service (rtPS) bit 2: Non-real-time Polling Service (nrtPS) bit 3: Best Effort bit 4: Extended real-time Polling Service (ertPS) If the value of bit 0 through bit 4 is 0b00000, it indicates no information on service available. bits 5-7: Indicate utilization level of RAS. |
| DCD Configuration Change Count | 4 | This represents the 4 LSBs of the Neighbor BS current DCD configuration change count |
| UCD Configuration Change Count | | This represents the 4 LSBs of the Neighbor BS current UCD configuration change count |
| TLV Encoded Neighbor information | variable | TLV specific |

As shown in Table 1, the MOB_NBR_ADV message includes various information elements (IE), such as a Management Message Type representing the type of a transmitted message, a Fragmentation Index representing a serial number of segmented messages when the MOB_NBR_ADV message is segmented and transmitted many times, a Total Fragmentation representing the number of the total segmented messages in the case of segmenting the MOB_NBR_ADV message just like the case of Fragmentation Index above, a Skip-Optional-Field bitmap, when a Base Station Identifier (BS-ID) in the message is omitted, representing the omitted BS-ID, an N_NEIGHBORS representing how many neighbor base station are currently included in neighbor base station information of the message, a Neighbor BS_ID representing identifiers (IDs) of the neighbor base stations, a Length representing the length of a represented field of a base station information, a PHY Profile ID representing an information identifier of a wireless channel used in a corresponding base station, an FA Index representing a unique identifier which indicates the assigned frequency of a corresponding base station, a BS EIRP representing the strength of transmitted power of a corresponding neighbor base station, an N_NEIGHBORS representing the number of the neighbor base stations, a Preamble Index representing an identifier of a preamble to be used in the corresponding sector of a corresponding base station, a HO Process Optimization representing information separating a indispensable procedure from a skippable procedure during a handover to a corresponding base station, a Scheduling Service Supported representing the class of QoS that a corresponding base station can support from among predefined various QoS classes among base stations, a Downlink Channel Descript (DCD) Configuration Change Count informing a serial number of a corresponding neighbor base station's DCD information representing availability of wireless channel resources of a corresponding base station, an Uplink Channel Descript (UCD) Configuration Change Count informing a serial number of a corresponding neighbor base station's UCD information, and a TLV Encoded Neighbor Information representing the other information related to the neighbor base station with the exception of information mentioned above.

With regard to the above and FIG. 4, the neighbor base station information from the Serving RAS 440, i.e., a utilization level of the base station, is set as shown in Table 2 below by using and configuring the remaining bits (bit 5 to bit 7) of the Scheduling Service Supported field in the MOB_N-BR_ADV message.

TABLE 2

| Bit 7 | Bit 6 | Bit 5 | Utilization |
|---|---|---|---|
| 0 | 0 | 0 | ~12.5% |
| 0 | 0 | 1 | ~25.0% |
| 0 | 1 | 0 | ~37.5% |
| 0 | 1 | 1 | ~50.0% |
| 1 | 0 | 0 | ~62.5% |
| 1 | 0 | 1 | ~75.0% |
| 1 | 1 | 0 | ~87.5% |
| 1 | 1 | 1 | ~100.0% |

The utilization level of the base station in Table 2 refers to the frequency of use and the number of users of the base station. Each of the base stations acquires the frequency of use and the number of users of the base station by periodically monitoring the number of users of the corresponding base station and the state of utilization of the corresponding base station. The state of utilization level is represented in the remaining bits of the Scheduling Service Supported field within the MOB_NBR_ADV message by using the monitored information, and the MOB_NBR_ADV message is generated and transmitted to the MS 400 according to a predetermined period.

Now referring to FIG. 4, upon receiving a MOB_NBR_ADV message including the base station utilization level, the MS 400 transmits a Mobile Station Scanning Interval Allocation Request (MOB_SCN_REQ) message to the Serving RAS 440 when the MS 400 desires to scan the quality of signals transmitted from base stations adjacent thereto (step 412). Here, a detailed description of a structure of the MOB_SCN_REQ message and a structure of a message to be described below will be omitted because the structures are typically the same as a structure of a message generally defined in a broadband wireless access communication system.

Since the MS 400 can communicate with a plurality of base stations, a plurality of base stations information may be included in the MOB_NBR_ADV message or in the MOB_SCN_RSP message to be mentioned below.

According to the present invention, the base station utilization level information may be included in the MOB_NBR_ADV message to be transmitted from the Serving RAS 440 to the MS 400, or may also be included in the MOB_SCN_RSP message. Therefore, the MS 400 can detect the utilization level of neighbor base stations through the MOB_NBR_ADV message or the MOB_SCN_RSP message, which are to be transmitted from the Serving RAS 440.

Upon receiving the MOB_SCN_REQ message, the Serving RAS 440 transmits an MS Scanning Interval Allocation Response (MOB_SCN_RSP) message, which includes information to be scanned by the MS 400, to the MS 400 (step 414).

As described above, the Serving RAS collects the information of the neighbor base stations within a corresponding cell area and configures the MOB_NBR_ADV message, and periodically transmits the MOB_NBR_ADV message to the MS. Then, the MS, which has received the MOB_NBR_ADV message periodically transmitted from the Serving RAS, can acquire scanning information for measuring the reception strength of neighbor base stations through the information included in each of fields of the MOB_NBR_ADV message. In other words, the MS can identify the neighbor base stations by using Neighbor BS_ID information and thus comes to recognize physical frequency band search information necessary for scanning through a physical frequency field from each of the neighbor base stations.

The MS 400 which has received the MOB_SCN_RSP message including the scanning information scans the neighbor base stations acquired from the receiving the MOB_NBR_ADV message (step 416).

In step 416 above, when the MS 400 determines whether to perform a handover by using the base station utilization level information included in the MOB_NBR_ADV message or the MOB_SCN_RSP message, it is possible for the MS 400 to select a target RAS in consideration of a utilization level of a base station as well as a reception strength of a base station. In selecting the Target RAS, the MS 400 can select a Target RAS corresponding to a maximum value with respect to the value of a base station's utilization level included in the MOB_NBR_ADV message or in the MOB_SCN_RSP message and the value of reception strength from the neighbor base station, which is obtained through a given operation process, and decide to perform a handover. Herein, the predetermined operation will be described in more detail in FIG. 6 below.

When a Target RAS 450 is selected in step 418, that is, when the MS 400 decides to change a current Serving RAS 440 to a different new base station, the MS 400 transmits an MS 400 Hand Over Request (MOB_MSHO_REQ) message to the Serving RAS 440 (step 422). The Serving RAS 440 transmits an MS handover Response (MOB_BSHO_RSP) message in response to the MOB_MSHO_REQ message to the MS 400 (step 424).

The MS 400, which has received the MOB_BSHO_RSP message, transmits a MOB_BSHO_REQ message in response to the MOB_BSHO_RSP message to the MS 400 (step 426). After transmitting the MS handover Indication (MOB_HO_IND) message to the Serving RAS 440 (step 428), the MS 400 completes the handover operation.

Figure 5:
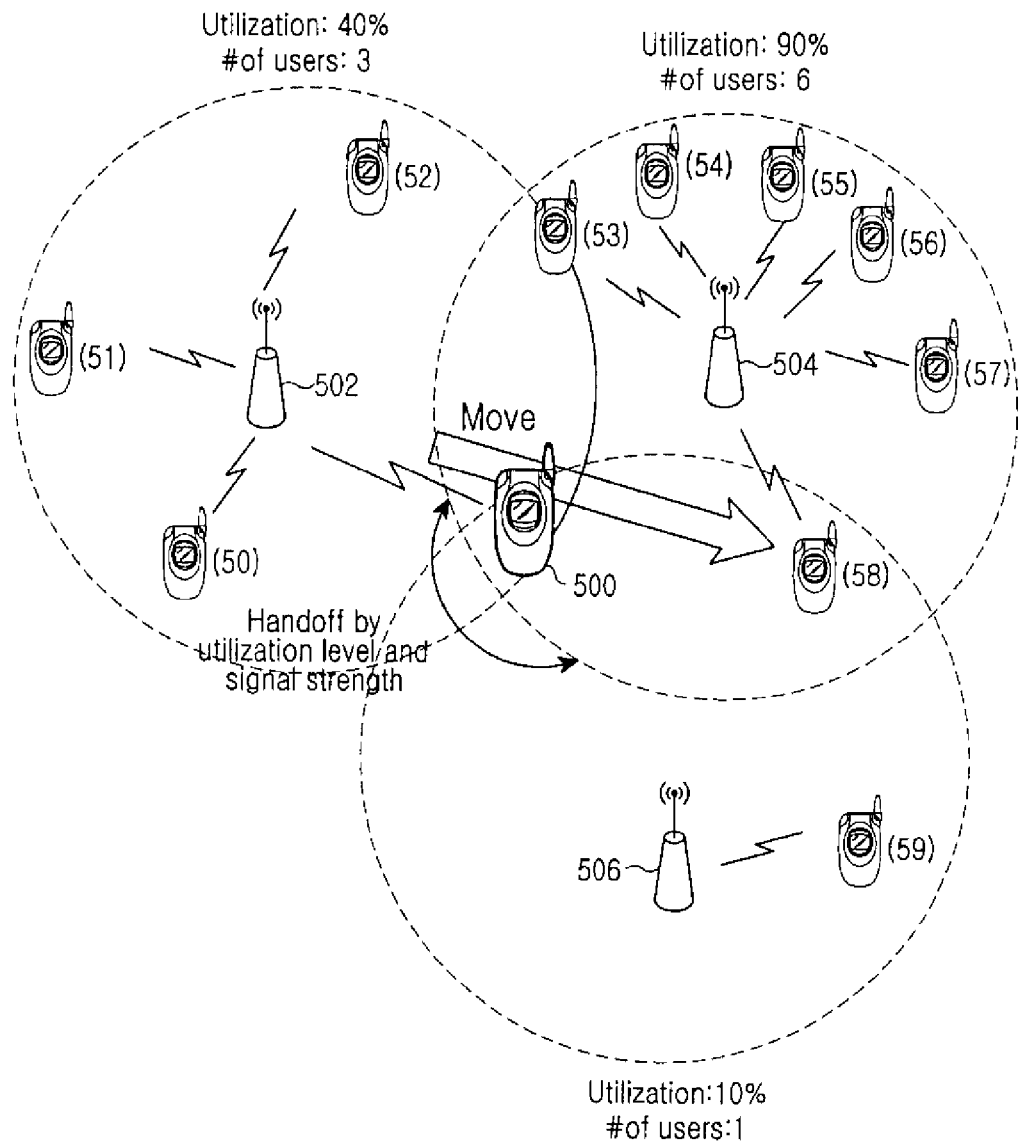
FIG. 5 is a view schematically illustrating a situation considering Quality of Service (QoS) and a signal strength between an MS and a base station during a handover in a broadband mobile communication system according to an exemplary embodiment of the present invention.

FIG. 5 is a view schematically illustrating the performance of a handover considering Quality of Service (QoS) in a broadband mobile communication system according to an exemplary embodiment of the present invention. Referring to FIG. 5, first, when MS 500 is located in a multi cell boundary area, i.e., an area where a handover is required, the MS 500 receives information about neighbor base stations 502, 504 and 506, i.e., a MOB_NBR_ADV message from a Serving RAS (not shown) with which the MS 500 currently communicates, which identifies a utilization level of each of the neighbor base stations through the received information about neighbor base stations 502, 504 and 506, and a reception strength from each of the neighbor base stations 502, 504 and 506. As illustrated in FIG. 5, for example, when the base stations 502, 504 and 506 are used with frequencies of 40%, 90% and 10% respectively, if strengths of received signals from the base station 502, 504 and 506 are about the same as each other, the MS 500 typically selects the base station 506 which has the least value of utilization level, and performs a handover.

Figure 6:
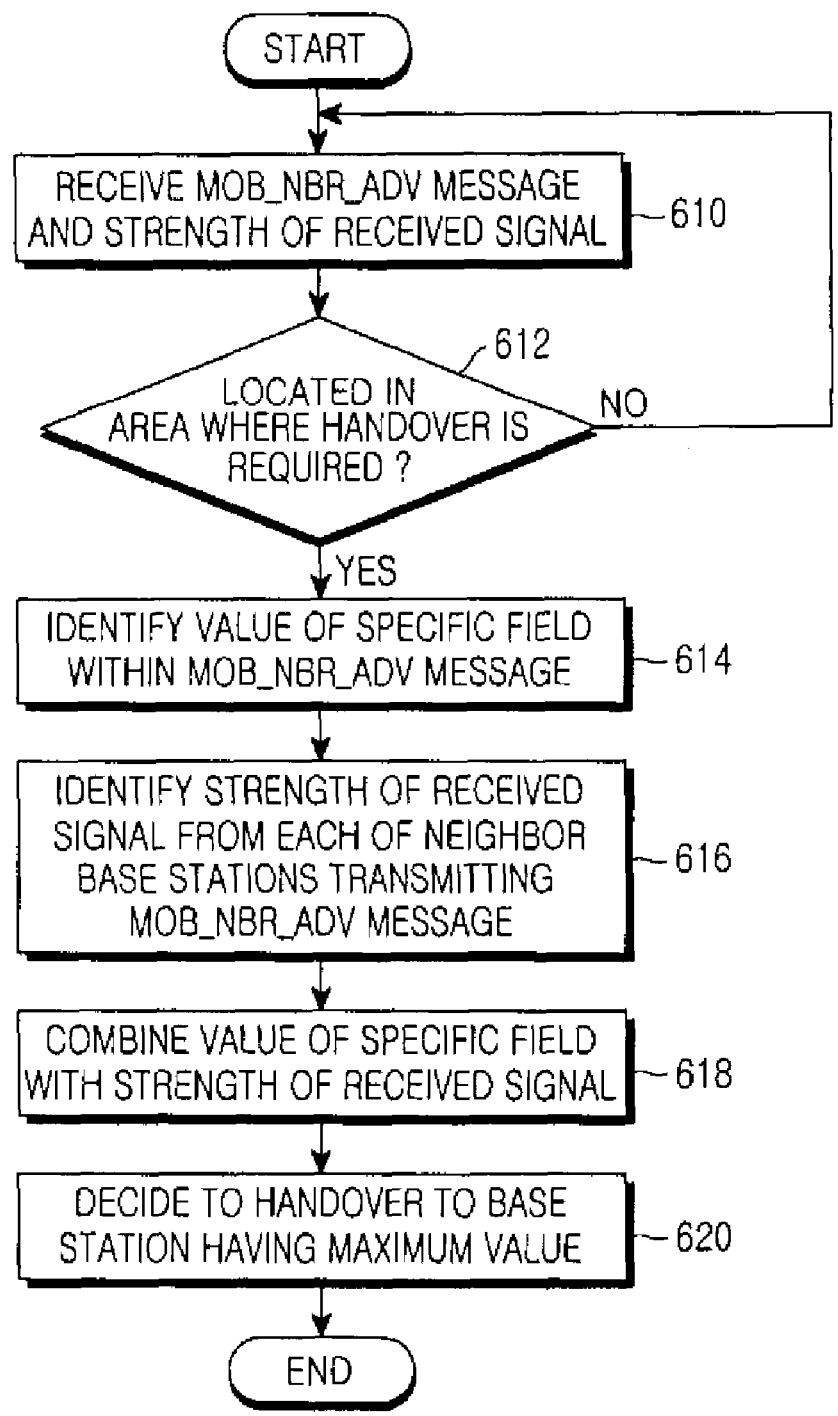
FIG. 6 is a flowchart illustrating an operation of an MS during a handover in a broadband mobile communication system according to an exemplary embodiment of the present invention.

FIG. 6 is a flowchart illustrating an operation of an MS while performing a handover considering Quality of Service (QoS) in a broadband mobile communication system according to an exemplary embodiment of the present invention. Referring to FIG. 6, the MS receives a MOB_NBR_ADV message about at least one neighbor base station from a Serving RAS with which the MS currently communicates and a strength of the received signal from the neighbor base station (step 610). When the MS is located in an area where a handover is required (step 612), the MS identifies a value of a specific field within the MOB_NBR_ADV message received from the Serving RAS, i.e., a utilization level of each of the at least one neighbor base stations (step 614), and then identifies a strength of the received signal from each of the neighbor base stations (step 616). In step 618, a base station's value of an utilization level included in the MOB_NBR_ADV message or in the MOB_SCN_RSP message and a value of a strength of received signal from the neighbor base station are combined as described in Equation (1) below.

$$2*(1-\text{Utilization})+(10+S_{ReceivedStrength}) \quad \text{Equation (1)}$$

∵ $S_{ReceivedStrength}$: reception strength [dB]

Here, it is assumed that the Utilization (a utilization level of a base station) has a value between 0 and 1. The value of 2 powered by (1−the Utilization) and the value of 10 added to the reception strength are predetermined values.

For example, when any base station's utilization level included in the MOB_NBR_ADV message corresponds to 0.10% and a strength of the received signal from the base station corresponds to 2 dB, a value of 13.8 is obtained by combining the two values by using Equation (1) above.

In this manner, the MS selects a maximum value among values, which are acquired by combining a value of a utilization level of each neighbor base station with a value of a reception strength of each neighbor base station, combined with values of utilization levels of various neighbor base stations and values of reception strengths of various neighbor base stations. The MS then determines which base station has the selected maximum value above to be a handover target base station.

Furthermore, according to the present invention, the less the utilization level is and the larger the reception strength is, the more ideal value combined with the utilization level and the reception strength can be obtained.

Figure 7:
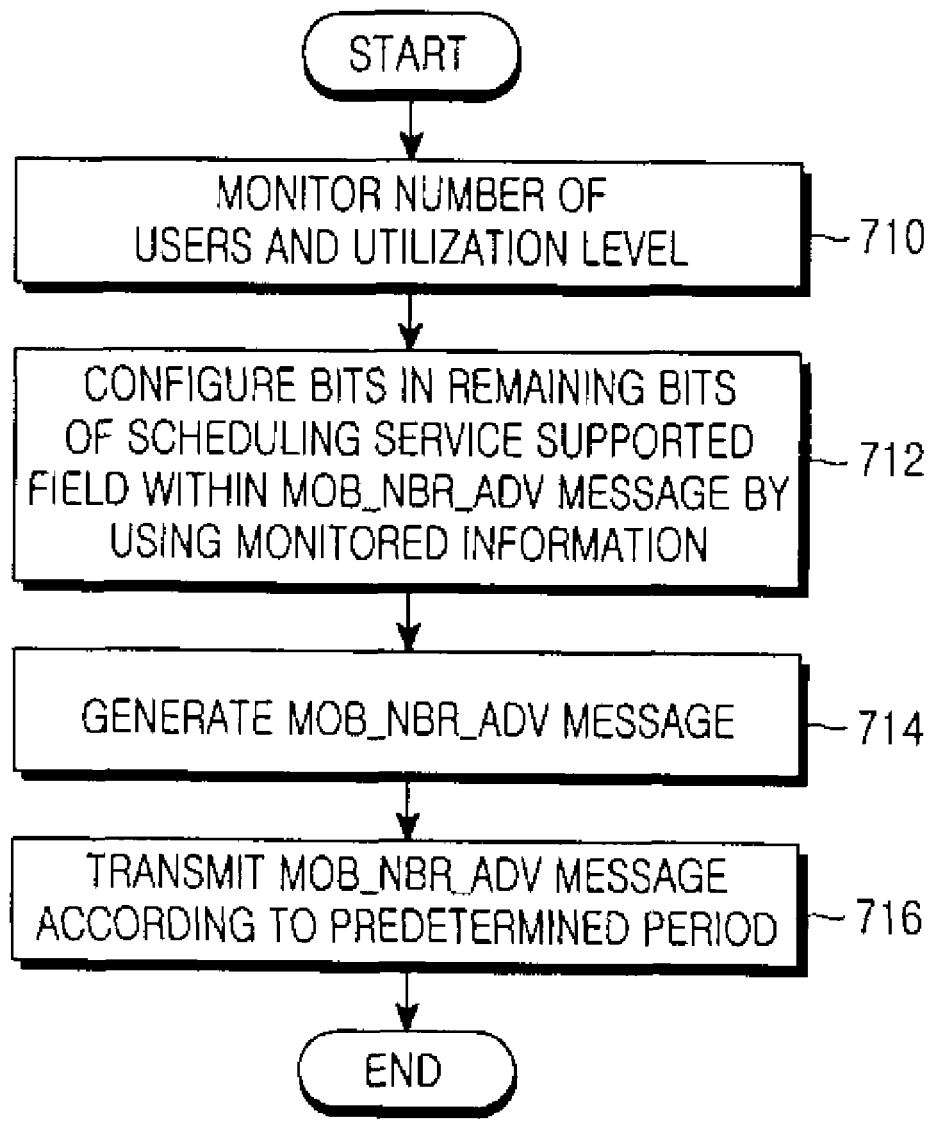
FIG. 7 is a flowchart illustrating an operation of a base station during a handover in a broadband mobile communication system according to an embodiment of the present invention.

FIG. 7 is a flowchart illustrating an operation of a base station during a handover in a broadband mobile communication system according to an embodiment of the present invention. Referring to FIG. 7, first, at step 710, a base station monitors the number of users currently being serviced in a cell area of the base station and a utilization level of the base station. The base station utilizes the monitored information, i.e., the number of users and the utilization level, and configures bits representing the number of users and the utilization level in the remaining bits of a specific field within a MOB_NBR_ADV message (step 712). The base station then generates the MOB_NBR_ADV message including the specific field that contains the number of users and the utilization level (step 714). In step 716, the base station transmits the generated MOB_NBR_ADV message to the MS according to a predetermined period.

As described above, a method for performing a handover considering QoS, and a configuration and an operation of a system for providing the same can be accomplished in a broadband mobile communication system according to exemplary embodiments of the present invention. While the invention has been shown and described with reference to certain exemplary embodiments thereof, it will be understood by those skilled in the art that various changes in form and details may be made therein without departing from the spirit of the invention and the scope of the appended claims. For example, the percentage utilization and/or received signal strength by which to base a target for handover is not limited to the values shown and described herein. Also, a quantity of neighbor base stations and the respective boundaries relative to a position of an MS at a given moment may not be as shown and described. Also, while an example of the specific field previously described herein preferably comprises three bits, it is within the spirit of the invention and the scope of the appended claims that the quantity of bits can be less than three or more than three.

What is claimed is:

1. A method for performing a handover of a mobile station (MS) in a broadband mobile communication system, the method comprising:
    (a) receiving information about respective neighbor base stations and reception strengths for the respective neighbor base stations from a Serving Radio Access System (RAS) currently communicating with the MS;
    (b) extracting a value of at least one specific field from the received information about the neighbor base stations, said information including a base station utilization level;
    (c) combining the extracted value regarding base station utilization level of the neighbor base stations with respective reception strengths of the neighbor base station to obtain respective combined values, the method of combining favoring higher reception strength and lower utilization level, wherein the utilization level provides a greater contribution to the combined value than the reception strength; and
    (d) selecting a maximum value from among the combined values in step (c);
    (e) selecting a base station corresponding to the selected maximum value from the neighbor base stations; and
    (f) transmitting a handover request message to the selected base station.

2. The method of claim 1, wherein the information about the neighbor base stations comprises a Mobile Neighbor Base-station Advertisement (MOB_NBR_ADV) message.

3. The method of claim 1, wherein the information about a utilization level of said base station of said one or more neighbor base stations is determined by a frequency of use of said base station and a number of users.

4. The method of claim 2, wherein the at least one specific field is allocated in the MOB_NBR_ADV message and is included within a Scheduling Service Supported field for representing a class of QoS that a given base station can support.

5. The method of claim 2, wherein the at least one specific field is allocated in the MOB_NBR_ADV message and is included within a Scheduling Service Supported field for representing a class of QoS that a given base station can support.

6. The method of claim 4, wherein the at least one specific field comprises three bits.

7. The method of claim 4, wherein the at least one specific field comprises more than three bits.

8. The method of claim 1, wherein the at least one specific field comprises at least one bit.

9. The method of claim 1, further comprising the step of receiving a handover indication message from the Serving RAS.

10. The method of claim 1, further comprising:
    monitoring a number of users and a state of a utilization of neighbor base stations by a current base station;
    collecting and generating information about neighbor base stations, including the monitored information; and
    transmitting the generated information about the neighbor base stations to at least one mobile station according to a predetermined period.

11. The method of claim 10, wherein the information about neighbor base stations corresponds to a MOB_NBR_ADV message.

12. The method of claim 11, wherein the MOB_NBR_ADV message includes status information in a specific field regarding utilization of a base station of the neighbor base stations.

13. The method of claim 12, wherein the specific field is allocated in the MOB_NBR_ADV message is included within a Scheduling Service Supported field for representing a class of QoS that a predetermined base station can support.

14. The method of claim 13, wherein the specific field comprises of three bits.

15. A system for providing a handover in a broadband mobile communication system, comprising:
an MS for:
receiving information about one or more neighbor base stations and respective reception strengths of said one or more neighbor base stations,
extracting a value of a specific field from the received information, the value being associated with a utilization level of a corresponding one of the one or more neighbor base stations, and
determining a handover to a base station from among the neighbor base stations said determining comprising:
combining the utilization level with a reception strength of a corresponding neighboring base station to obtain a combined value for each neighbor base station, said combined value formulated to favor high reception strength and low utilization, wherein the utilization level provides a greater contribution to the combined value than the reception strength;
selecting the base station having a maximum combined value as a base station to handover to; and
a Serving Radio Access System (RAS) for:
monitoring a number of users and a utilization level of said one or more neighbor base stations,
collecting and generating information about said one or more neighbor base stations by using the monitored information, and
transmitting the generated information about said one or more neighbor base stations to the MS according to a predetermined period.

16. The system of claim 15, wherein the information about said one or more neighbor base stations corresponds to information contained in a Mobile Neighbor Base-station Advertisement (MOB_NBR_ADV) message.

17. The system of claim 16, wherein information about the utilization level of a base station of said one or more neighbor base stations is included in the specific field within the MOB_NBR_ADV message.

18. The system of claim 17, wherein the information about the utilization level of the base station of said one or more neighbor base stations is determined by an amount of usage of the base station and a number of users.

19. The system of claim 17, wherein the specific field is allocated in the MOB_NBR_ADV message and is included within a Scheduling Service Supported field for representing a class of QoS that a predetermined base station can support.

20. The system of claim 18, wherein the specific field is allocated in the MOB_NBR_ADV message and is included within a Scheduling Service Supported field for representing a class of QoS that a predetermined base station can support.

21. The system of claim 19, wherein the specific field comprises three bits.

* * * * *